United States Patent
Fujita et al.

(10) Patent No.: US 7,189,347 B2
(45) Date of Patent: *Mar. 13, 2007

(54) LAMINATED BIAXIALLY-ORIENTED POLYAMIDE FILM AND PROCESS FOR PRODUCING THE SAME

(75) Inventors: Shinji Fujita, Otsu (JP); Yukinobu Mukoyama, Otsu (JP); Katsuya Ito, Otsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/362,269

(22) PCT Filed: Aug. 22, 2001

(86) PCT No.: PCT/JP01/07173

§ 371 (c)(1),
(2), (4) Date: Feb. 21, 2003

(87) PCT Pub. No.: WO02/16133

PCT Pub. Date: Feb. 28, 2002

(65) Prior Publication Data

US 2004/0023049 A1    Feb. 5, 2004

(30) Foreign Application Priority Data

Aug. 22, 2000  (JP)  ............................. 2000-251326

(51) Int. Cl.
| | | |
|---|---|---|
| *B32B 3/10* | (2006.01) | |
| *B32B 5/14* | (2006.01) | |
| *B32B 27/34* | (2006.01) | |
| *B29C 55/12* | (2006.01) | |
| *B29C 71/00* | (2006.01) | |

(52) U.S. Cl. ............................. 264/235.8; 229/87.01; 229/87.08; 264/290.2; 428/35.7; 428/143; 428/323; 428/474.4; 428/474.7; 428/474.9; 428/475.2; 428/910

(58) Field of Classification Search ................ 428/143, 428/323, 35.7, 474.4, 474.7, 474.9, 475.2, 428/910; 264/235.8, 290.2; 229/87.01, 229/87.08
See application file for complete search history.

(56) References Cited

U.S. PATENT DOCUMENTS

| | | |
|---|---|---|
| 3,843,479 A | 10/1974 | Matsunami et al. |
| RE29,340 E | 8/1977 | Matsunami et al. |
| 5,480,690 A | 1/1996 | Stenger et al. |
| 5,718,965 A | 2/1998 | Shiroeda et al. |
| 6,124,021 A | 9/2000 | Hanada |
| 6,376,093 B1 | 4/2002 | Fujita et al. |

FOREIGN PATENT DOCUMENTS

| | | |
|---|---|---|
| DE | 21 65 399 A | 7/1972 |
| DE | 40 01 612 A1 | 7/1991 |
| EP | 0 719 631 A2 | 7/1996 |
| EP | 0 818 508 A2 | 1/1998 |
| EP | 0 879 695 A2 | 11/1998 |
| EP | 0 960 903 A2 | 12/1999 |
| EP | 1 190 847 A1 | 3/2002 |
| JP | 03-146343 A | 6/1991 |
| JP | 08-156205 A | 6/1996 |
| JP | 10-007904 A | 1/1998 |
| JP | 10-024489 A | 1/1998 |
| JP | 10-025415 A | 1/1998 |
| JP | 11-034260 A | 2/1999 |
| JP | 11-291426 A | 10/1999 |
| JP | 11-334006 A | 12/1999 |
| JP | 11-334007 A | 12/1999 |
| JP | 2000-198173 A | 7/2000 |
| JP | 2000-238129 A | 9/2000 |
| JP | 2002-029015 A | 1/2002 |

*Primary Examiner*—Ana L. Woodward
(74) *Attorney, Agent, or Firm*—Leydig, Voit & Mayer, Ltd.

(57) ABSTRACT

A biaxially oriented polyamide laminate film having a layered structure of A/B, A/B/A or A/B/C, layer A having no projections with a height of 0.27 μm or higher on the surface, or having a density of projections with a height of 0.27 μm or higher on the surface of 200 projections/mm$^2$, and the film exhibiting a maximum dimensional change of 4% or less during immersion in 95° C. hot water, a maximum dimensional change of 6% or less after withdrawal from the hot water, and a maximum dimensional change of 4% or less after heat treatment in dry hot air at 160° C.; and a process for producing the same.

This film reduces the differences in physical properties in the width direction that occurs in a tenter and exhibits excellent adhesive properties, resistance to fatigue from flexing and operability, and can be provided economically.

9 Claims, No Drawings

LAMINATED BIAXIALLY-ORIENTED POLYAMIDE FILM AND PROCESS FOR PRODUCING THE SAME

TECHNICAL FIELD

The present invention relates to a biaxially oriented polyamide laminate film which exhibits excellent adhesion strength with other members, which is an important characteristic for a wrapping film for fresh food, processed food, pharmaceutical products, medical device, electronic components and the like, and which has uniform physical properties in the width direction of the film, and a process for producing the same.

BACKGROUND ART

Recently, food-wrapping methods have significantly changed in accordance with changes in food distribution systems and dietary habits, and has created increasingly rigorous demands with respect to wrapping film characteristics.

In the prior art, a biaxially oriented polyamide film has been widely used as a wrapping material for liquid food, liquid-immersed food, frozen food, retort food, paste food, animal and marine products and the like, such as soups, pastes made from konjak flour (konjak), hamburger steaks, fermented soybean pastes (miso), ham, etc. due to its characteristics, such as toughness, excellent gas barrier properties, pin-hole resistance, transparency, easy printability and the like.

In practice, a biaxially oriented polyamide laminate film is prepared by forming a printed layer and an adhesive layer on top of a biaxially oriented polyamide film, and forming thereon a sealant layer by a dry laminating method or an extrusion laminating method. The biaxially oriented polyamide laminate film thus obtained is used to produce a bag, and the opening is heat sealed after the contents are inserted into the bag. Seasonings, such as fermented soybean pastes (miso), soy sauce and the like; moisture-containing food, such as soups, retort food and the like; pharmaceutical products and the like are packaged into such a biaxially oriented polyamide laminate film bag and supplied to consumers.

As the method for producing a biaxially oriented film by the flat method, successive biaxial stretching method and simultaneous biaxial stretching method are known. These methods are also used for producing polyamide film.

However, it is known that the above-mentioned biaxial stretching methods often produce differences in physical properties in the width direction of the film, which is perpendicular to the film running direction. Namely, during the transverse stretching step in the successive biaxial stretching method, or the longitudinal/transverse simultaneous stretching step in the simultaneous biaxial stretching method, longitudinal shrinkage occurs in the tenter due to longitudinal thermal shrinkage stress caused by heating during the heat setting step immediately after transverse stretching, based on the stretching stress in the longitudinal direction caused by the transverse stretching. Since the film edges are gripped by clips and either restrained or allowed to progress in the film running direction, the forming speed of the central part of the film is slower than those of the ends of the film due to the above-mentioned longitudinal shrinkage (bowing phenomenon). Therefore, for example, the difference between the boiling water shrinkage proportions in oblique directions increases at the edge parts of the film, causing a twisting phenomenon when a bag prepared in this manner is subjected to heating or a like treatment, and leads to serious problems.

For solving this problem, it is effective to lower the heat setting temperature to thereby reduce the above-mentioned longitudinal stress. However, lowering the heat setting temperature reduces the adhesion strength between the film and the sealant layer, and is not preferable.

DISCLOSURE OF THE INVENTION

An object of the present invention is to provide a biaxially oriented polyamide laminate film, which is biaxially stretched by a flat method and exhibits excellent adhesive properties between the film and a sealant layer as well as excellent resistance to fatigue from flexing and operability, and which reduces the differences in physical properties in the film width direction, i.e., perpendicular to the film running direction, that occurs in the tenter; and to a process for producing the same.

The present invention provides the following biaxially oriented polyamide laminate film and a process for producing the same.

1. A biaxially oriented polyamide laminate film having a layered structure of A/B, A/B/A, or A/B/C, layer A having no projections with a height of 0.27 μm or higher on the surface, or having a density of projections with a height of 0.27 μm or higher present on the surface of less than 200 projections/mm$^2$, and the film exhibiting a maximum dimensional change of 4% or less during immersion in 95° C. hot water, a maximum dimensional change of 6% or less after withdrawal from said hot water, and a maximum dimensional change of 4% or less after heat treatment in dry hot air at 160° C.

2. The biaxially oriented polyamide laminate film according to item 1, wherein
   layer A comprises i) a composition containing X shown below, or ii) a composition containing X and Y shown below;
   layer B comprises iii) a composition containing Y shown below, iv) a composition containing Y and X shown below, v) a composition containing Y and Z shown below, or vi) a composition containing X, Y and Z shown below;
   layer C comprises of vii) a composition containing X shown below, viii) a composition containing Y shown below, or ix) a composition containing X and Y shown below.

X: 1) a resin composition which is a mixture of (a) an aromatic polyamide resin obtained by reacting a terephthalic acid with an aliphatic diamine, and/or an aromatic polyamide resin obtained by reacting an adipic acid and meta-xylylenediamine, and (b) an aliphatic polyamide resin, wherein the aromatic polyamide resin (a) is contained in an amount of 10 mol % or more; or
   2) a resin composition which is a copolymer of the monomers of (a) and the monomers of (b), wherein the monomers of (a) is contained in an amount of 10 mol % or more Y: an aliphatic polyamide resin Z: an improver of resistance to fatigue from flexing 3. The biaxially oriented polyamide laminate film according to item 1, wherein the compositions used for layers A and C each comprises 50 to 100 wt. % of X and 0 to 50 wt. % of Y, and the composition used for layer B comprises 0 to 10 wt. % of X, 80 to 100 wt. % of Y and 0 to 10 wt. % of Z.

4. The biaxially oriented polyamide laminate film according to item 1, wherein an anchor coat layer is formed on at least one surface of the film.

5. The biaxially oriented polyamide laminate film according to item 1, wherein a sealant layer is formed on at least one surface of the film.

6. The biaxially oriented polyamide laminate film according to item 4, wherein the sealant layer is formed on the anchor coat layer.

7. A biaxially oriented polyamide laminate film having the following layered structure of A/B, layer A having no projections with a height of 0.27 μm or higher on the surface, or having a density of projections with a height of 0.27 μm or higher on the surface of less than 200 projections/mm², and the film exhibiting a maximum dimensional change of 4% or less during immersion in 95° C. hot water, a maximum dimensional change of 6% or less after withdrawal from said hot water, and a maximum dimensional change of 4% or less after heat treatment in dry hot air at 160° C.

A/B layered structure: layer A comprising a composition containing X and layer B comprising a composition comprising Y and Z 8. The biaxially oriented polyamide laminate film according to item 7, wherein an anchor coat layer is formed on at least one surface of the film.

9. The biaxially oriented polyamide laminate film according to item 7, wherein a sealant layer is formed on at least one surface of the film.

10. The biaxially oriented polyamide laminate film according to item 8, wherein the sealant layer is formed on the anchor coat layer.

11. A biaxially oriented polyamide laminate film having the following layered structure of A/B/A, layer A having no projections with a height of 0.27 μm or higher on the surface, or having a density of projections with a height of 0.27 μm or higher on the surface of less than 200 projections/mm², and the film exhibiting a maximum dimensional change of 4% or less during immersion in 95° C. hot water, a maximum dimensional change of 6% or less after withdrawal from said hot water, and a maximum dimensional change of 4% or less after heat treatment in dry hot air at 160° C.

A/B/A layered structure: layer A comprising a composition containing X, layer B comprising a composition containing Y and Z, and layer A comprising a composition containing X 12. The biaxially oriented polyamide laminate film according to item 11, wherein an anchor coat layer is formed on at least one surface of the film.

13. The biaxially oriented polyamide laminate film according to item 11, wherein a sealant layer is formed on at least one surface of the film.

14. The biaxially oriented polyamide laminate film according to item 12, wherein the sealant layer is formed on the anchor coat layer.

15. A biaxially oriented polyamide laminate film having the following layered structure of A/B/C, layer A having no projections with a height of 0.27 μm or higher on the surface, or having a density of projections with a height of 0.27 μm or higher on the surface of less than 200 projections/mm², the film exhibiting a maximum dimensional change of 4% or less during immersion in 95° C. hot water, a maximum dimensional change of 6% or less after withdrawal from said hot water, and a maximum dimensional change of 4% or less after heat treatment in dry hot air at 160° C.

A/B/C layered structure: layer A comprising a composition containing X, layer B comprising a composition containing Y, Z and X, and layer C comprising a composition containing X (the composition different from that of layer A in kind and/or proportions of components)

16. The biaxially oriented polyamide laminate film according to item 15, wherein an anchor coat layer is formed on at least one surface of the film.

17. The biaxially oriented polyamide laminate film according to item 15, wherein a sealant layer is formed on at least one surface of the film.

18. The biaxially oriented polyamide laminate film according to item 16, wherein the sealant layer is formed on the anchor coat layer.

19. A wrapping container formed using the biaxially oriented polyamide laminate film according to any one of items 1 to 18.

20. Use of the biaxially oriented polyamide laminate film according to any one of items 1 to 18 as a wrapping material.

21. A process for producing a biaxially oriented polyamide laminate film using a successive biaxial stretching method which comprises longitudinally stretching a substantially unoriented laminated polyamide film having a layered structure of A/B, A/B/A or A/B/C, followed by transverse stretching at a ratio of 3 times or more, the longitudinal stretching being performed by carrying out a first stage stretching the unoriented film at a temperature that is not less than the glass transition temperature of the unoriented laminated polyamide film+10° C. and not more than the lower crystallization temperature of the unoriented laminated polyamide film+20° C., at a stretching ratio of 1.1 to 3 times, and then, without cooling the stretched film to the glass transition temperature of the unoriented laminated polyamide film or lower, carrying out a second stretching stage of stretching the resulting film at a temperature that is not less than the glass transition temperature of the unoriented laminated polyamide film+10° C. and not more than the low-temperature crystallization temperature of the unoriented polyamide film+20° C. in such a manner that the overall longitudinal stretching ratio becomes 3.1 to 4 times.

DISCLOSURE OF THE INVENTION

The biaxially oriented polyamide laminate film of the present invention has a layered structure of A/B, A/B/A or A/B/C, and is characterized in that layer A has no projections with a height of 0.27 μm or higher on the surface, or has a density of projections with a height of 0.27 μm or higher on the surface of less than 200 projections/mm², the film exhibits a maximum dimensional change of 4% or less during immersion in 95° C. hot water, a maximum dimensional change of 6% or less after withdrawal from said hot water, and a maximum dimensional change of 4% or less after heat treatment in dry hot air at 160° C.

Due to the above-mentioned structure, even after boiling or retort treatment, the biaxially oriented polyamide laminate film of the present invention can maintain excellent adhesive properties between a sealant layer, which may be formed later, and the biaxially oriented polyamide laminate film layer.

Projections

The film of the present invention has no projections with a height of 0.27 μm or higher on the surface of layer A, or has projections with a height of 0.27 μm or higher on the surface of layer A at a density of less than 200 projections/mm² over the entire width of the film. When the density of projections with a height of 0.27 μm or higher is less than 200 projections/mm², the deformation stress that occurs during boiling or retort treatment is unlikely to cause destruction or separation of a sealant layer and the biaxially oriented polyamide laminate film layer, whereby excellent adhesive properties between the layers is maintained. The density of projections with a height of 0.27 μm or higher on the surface of layer A is preferably 180 projections/mm² or less, and is more preferably 150 projections/mm² or less. The upper limit of the height of projections is not specifically restricted, but is generally about 0.5 μm.

Although such projections may be formed by ordinary methods, the following method, for example, is preferably used. That is, fine particles for forming surface projections are incorporated into layer A prior to stretching. Examples of such fine particles include silica, kaolin, zeolite and like inorganic lubricants; or acrylic, polystyrene and like polymer organic lubricants; each having an average particle size of about 0.5 to about 5 μm, and preferably about 0.5 to about 3 μm. The amount of fine particles for forming surface projections in layer A is generally about 0 to about 0.3 wt. %, and preferably about 0 to about 0.1 wt. %. When layer A contains about 0 to about 0.3 wt. % of fine particles for forming surface projections prior to stretching, no projections with a height of 0.27 μm or higher are formed on the surface of layer A, or projections with a height of 0.27 μm or higher are formed at a density of less than 200 projections/mm², after stretching.

When layer A contains about 0 to about 0.3 wt. % of fine particles for forming surface projections having an average particle size of about 0.5 to about 5 μm prior to stretching, projections formed on the surface of the film after the stretching process do not become excessively high, that is, the surface of the film does not become excessively rough, thereby making it possible to maintain excellent adhesion between a sealant layer and the biaxially oriented polyamide film layer.

Moreover, on the surface of layers B and C of the biaxially oriented polyamide laminate film of the present invention, projections of the same height and number as or a greater height and number than those generally formed on the surface of the laminated polyamide film may be formed. On the surface of the layer A side, onto which a sealant layer is not formed, projections with a height of 0.27 μm or higher may be formed at a density of less than 200 projections/mm² (or layer A may have no projections with a height of 0.27 μm or higher), or projections of the same height and number as or a greater height and number than those generally formed on the surface of a laminated polyamide film may be formed.

Maximum Dimensional Change

The biaxially oriented polyamide laminate film of the present invention exhibits a maximum dimensional change of about 4% or less during immersion in 95° C. hot water, a maximum dimensional change of about 6% or less after withdrawal from said hot water, and a maximum dimensional change of about 4% or less after heat treatment in dry hot air at 160° C., and therefore deformation stress is unlikely to occur in both of a sealant layer and a biaxially oriented polyamide laminate film layer during boiling or retort treatment. Therefore destruction or separation of the layers is unlikely to occur, and excellent adhesion is maintained between the sealant layer and the biaxially oriented polyamide laminate film layer after boiling or retort treatment.

The film of the present invention has a maximum dimensional change of preferably 3.5% or less, and more preferably 2.5% or less, during immersion in 95° C. hot water. Moreover, the film of the present invention has a maximum dimensional change of preferably 4% or less, and more preferably 3.5% or less, after being immersed in 95° C. hot water and withdrawn from the hot water. Furthermore, the above-mentioned biaxially oriented polyamide film preferably has a maximum dimensional change ratio of 3.5% or less, and more preferably 2.5% or less, after heat treatment in dry hot air at 160° C.

Composition of Each Layer

In the biaxially oriented polyamide laminate film of the present invention, it is preferable that layer A comprises of i) a composition containing X shown below, or ii) a composition containing X and Y shown below;

layer B comprises of iii) a composition containing Y shown below, iv) a composition containing Y and X shown below, v) a composition containing Y and Z shown below, or vi) a composition containing X, Y and Z shown below;

layer C comprises of vii) a composition containing X shown below, viii) a composition containing Y shown below, or ix) a composition containing X and Y shown below.

X: 1) a resin composition which is a mixture of (a) an aromatic polyamide resin obtained by reacting a terephthalic acid with an aliphatic diamine, and/or an aromatic polyamide resin obtained by reacting an adipic acid and meta-xylylenediamine, and (b) an aliphatic polyamide resin, wherein (a) is contained in an amount of 10 mol % or more; or 2) a resin composition which is a copolymer of the monomers constituting (a) and the monomers constituting (b), wherein the monomers of constituting (a) is contained in an amount of 10 mol % or more Y: an aliphatic polyamide resin Z: an improver of resistance to fatigue from flexing The resin composition constituting X has a relative viscosity of preferably about 1.9 to about 3.2, and more preferably about 2 to about 3. The relative viscosity (Rv) of the polyamide resin or polyamide resin composition was measured by the following method. Specifically, 0.25 g of the polyamide resin or polyamide resin composition was dissolved in 25 ml of 96% sulfuric acid (solvent) to prepare a sample solution. Ten ml of this sample solution was applied to an Ostwald viscometer, and the falling time (in seconds) of the solvent and sample solution was measured at a temperature of 20° C. The Rv value was calculated by the following formula.

$$Rv = t/t_0$$

$t_0$: falling time of a solvent (in seconds)

$t$: falling time of a sample solution (in seconds)

It is preferable that the resin composition constituting X contains 20 mol % or more, particularly 30 mol % or more, of (a), or the monomer constituting (a).

There are no particular restrictions on aliphatic polyamide resin (b) to be used for X, and any known aliphatic polyamides may be used. Examples of such known aliphatic polyamides include nylon 4, nylon 6, nylon 7, nylon 11, nylon 12, nylon 66, nylon 612, nylon 46; and copolymers thereof. Particularly, nylon 6 and nylon 66 are preferable, and nylon 6 is more preferable. These may be used alone, or two or more of them may be used in combination. These may include anti-blocking agents, antistatic agents, stabilizers and other various additives, as required, insofar as the characteristics of these polyamides are not impaired.

There are no particular restrictions on the improvers of resistance to fatigue from flexing, and any known improvers may be used. Examples of such known improvers of resistance to fatigue from flexing include a block polyesteramide, a block polyetheramide, a polyetheresteramide elastomer, a polyester elastomer, a modified ethylene propylene rubber, a modified acrylic elastomer, an ethylene/acrylate copolymer and the like. Particularly, a block polyesteramide, a block polyetheramide and a polyetheresteramide elastomer are preferable, and a polyetheresteramide elastomer is more preferable. These improvers may be used alone, or two or more of them may be used in combination.

In the biaxially oriented polyamide laminate film of the present invention, it is preferable that the compositions to be used for layers A and C are each comprising about 50 to about 100 wt. %, particularly about 60 to about 100 wt. %, of X, and about 0 to about 50 wt. %, particularly about 0 to about 40 wt. %, of Y.

It is preferable that the composition to be used for the layer B is obtained by mixing about 0 to about 10 wt. %, particularly about 0 to about 5 wt. %, of X; about 80 to about 100 wt. %, particularly about 90 to about 99.8 wt. %, of Y; and about 0 to about 10 wt. %, particularly about 0.2 to about 5 wt. %, of Z. From the standpoint of obtaining resistance to flexing test, it is more preferable that the composition to be used for layer B is free of X (i.e., the content of X is 0 wt. %).

The biaxially oriented polyamide laminate film of the present invention preferably has a film thickness of about 5 to about 50 μm, particularly about 10 to about 30 μm.

A Film Having a Layered Structure of A/B

When the biaxially oriented polyamide laminate film of the present invention has a layered structure of A/B, the preferable combinations of the composition of each layer are as follows:

a combination of layer A comprising of a composition containing X and layer B comprising of a composition containing Y, a combination of layer A comprising a composition containing X and layer B comprising a composition containing Y and Z (a composition containing 90 to 99.8 wt. % of Y and 0.2 to 10 wt. % of Z is particularly preferable), a combination of layer A comprising a composition containing X and layer B comprising a composition containing Y, Z and X (a composition containing 85 to 99.7 wt. % of Y, 0.2 to 10 wt. % of Z and 0.1 to 5 wt. % of X is particularly preferable), and a combination of layer A comprising a composition containing X and layer B comprising a composition containing Y and X (a composition containing 95 to 99.9 wt. % of Y and 0.1 to 5 wt. % of X is particularly preferable), and so on.

Particularly, a combination of layer A comprising a composition containing X and layer B comprising a composition containing Y and Z, is preferable, and a combination of layer A comprising a composition containing X and layer B comprising a composition containing 90 to 99.8 wt. % of Y and 0.2 to 10 wt. % of Z, is more preferable.

When the film of the present invention has a layered structure of A/B, the proportion of the thickness of layer A to the total thickness of the film is preferably about 5 to about 50%, preferably about 10 to about 40% and more preferably about 12 to about 35%. Layer A having a thickness within the above-mentioned range imparts sufficient dimensional stability to the film and provides good adhesive properties between the sealant layer and the biaxially oriented polyamide laminate film layer, as well as good resistance to fatigue from flexing and pinhole resistance.

Moreover, not only layer A, but also layer B may contain lubricants.

A Film Having a Layered Structure of A/B/A

When the biaxially oriented polyamide laminate film of the present invention has a layered structure of A/B/A, the preferable combinations of the composition of each layer are as follows:

a combination of layer A comprising a composition containing X, layer B comprising a composition containing Y and layer A comprising a composition containing X, a combination of layer A comprising a composition containing X, layer B comprising a composition containing Y and Z (a composition containing 90 to 99.8 wt. % of Y and 0.2 to 10 wt. % of Z is particularly preferable) and layer A comprising of a composition containing X, a combination of layer A comprising a composition containing X, layer B comprising a composition containing Y, Z and X (a composition containing 85 to 99.7 wt. % of Y, 0.2 to 10 wt. % of Z and 0.1 to 5 wt. % of X is particularly preferable) and layer A comprising a composition containing X, a combination of layer A comprising a composition containing X, layer B comprising a composition containing Y and X (a composition containing 95 to 99.9 wt. % of Y, and 0.1 to 5 wt. % of X is particularly preferable) and layer A comprising a composition containing X, and so on.

Particularly, a combination of layer A comprising a composition containing X, layer B comprising a composition containing Y and Z, and layer C comprising a composition containing X is preferable; and a combination of layer A comprising a composition containing X, layer B comprising a composition containing 90 to 99.8 wt. % of Y, and 0.2 to 10 wt. % of Z and layer C comprising a composition containing X, is more preferable.

Moreover, the composition of layer A to be heat-sealed, and the composition of layer A not to be heat-sealed may be same or different. It is preferable that layer A to be heat-sealed contains a polyamide resin or the monomer of the polyamide resin (a) in X in a greater amount than layer A not to be heat-sealed.

The proportion of the thickness of each layer A to the total thickness of the film is preferably about 5 to about 25%, and preferably about 5 to about 20% respectively. The proportion of the total thickness of both layers A to the total thickness of the film is about 10 to about 50 wt %, preferably about 10 to about 40%, and more preferably about 12 to about 35%. Layer A having a thickness within the above-mentioned range leads sufficient dimensional stability to the film and provides good adhesive properties between the sealant layer and the biaxially oriented polyamide laminate film layer, as well as excellent resistance to fatigue from flexing and pinhole resistance.

Moreover, not only single layer A or both layers A, but also layer B may contain lubricants.

A Film Having a Layered Structure of A/B/C

When the biaxially oriented polyamide laminate film of the present invention has a layered structure of A/B/C, the preferable combinations of the composition of each layer are as follows:

a combination of layer A comprising a composition containing X, layer B comprising a composition containing Y and layer C comprising a composition containing X, a combination of layer A comprising a composition containing X, layer B comprising a composition containing Y and X, and layer C comprising a composition containing X (the composition is different from that of layer A in kind and/or proportion of components), a combination of layer A comprising a composition containing X, layer B comprising a composition containing Y and Z, and layer C comprising a composition containing X (the composition is different from that of layer A in kind and/or proportion of components), a combination of layer A comprising a composition containing X, layer B comprising a composition containing Y, Z and X, and layer C comprising a composition containing X (the composition is different from that of layer A in kind and/or proportion of components), and so on.

Particularly, a combination of layer A comprising a composition containing X, layer B comprising a composition containing Y, Z and X, and layer C comprising a composition containing X (the composition is different from that of layer A in kind and/or proportion of components) is preferable.

Moreover, when each of layers A and C comprises a composition containing X, or a composition containing X and Y, the preferable combinations of specific resin compositions are described below:

a combination of layer A comprising a resin composition containing a nylon 6T/nylon 6 copolymer and an aliphatic polyamide, and layer C comprising a resin composition containing MXD-6 and an aliphatic polyamide, a combination of layer A comprising a resin composition containing a nylon 6T/nylon 6 copolymer and an aliphatic polyamide, layer C comprising a resin composition containing a nylon 6T/nylon 6 copolymer and an aliphatic polyamide (the composition contains a nylon 6T/nylon 6 copolymer in a smaller amount than that of layer A), a combination of layer A comprising a resin composition containing MXD-6 and an aliphatic polyamide, and layer C comprising a resin composition containing a nylon 6T/nylon 6 copolymer and an aliphatic polyamide, a combination of layer A comprising a resin composition containing a nylon 6T/nylon 6 copolymer and an aliphatic polyamide, and layer C comprising a resin composition containing a nylon 6T/nylon 6 copolymer (the copolymer has a lower ratio in copolymerization of nylon 6T than that of layer A) and an aliphatic polyamide.

Particularly, a combination of layer A comprising a resin composition containing a nylon 6T/nylon 6 copolymer and an aliphatic polyamide, and layer C comprising a resin composition containing MXD-6 and an aliphatic polyamide; and a combination of layer A comprising a resin composition containing a nylon 6T/nylon 6 copolymer and an aliphatic polyamide, and layer C comprising a resin composition containing a nylon 6T/nylon 6 copolymer and an aliphatic polyamide (the composition contains a nylon 6T/nylon 6 copolymer at a lower content ratio than that of layer A) are more preferable.

When the film of the present invention has a layered structure of A/B/C, it is preferable that the proportion of thickness of layer A to the total thickness of the film is about 5 to about 25%, and particularly about 5 to about 20%. Moreover, it is preferable that the ratio of the total thickness of layers A and C to the total thickness of the film is about 10 to about 50 wt %, and particularly about 10 to about 40%, and more particularly about 12 to about 35%. Layers A and C having a thickness within the above-mentioned range leads sufficient dimensional stability to the film and provides good adhesive properties between the sealant layer and the biaxially oriented polyamide laminate film layer, as well as excellent resistance to fatigue from flexing and pinhole resistance.

Moreover, not only layer A, but also layers B and C may contain lubricants.

Anchor Coat Layer

The biaxially oriented polyamide laminate film of the present invention may have an anchor coat layer on at least one surface onto which a sealant layer is provided, and preferably on the surface of layer A, to improve the adhesive strength between the sealant layer and the film.

The thickness of the anchor coat layer is not specifically restricted, but is generally about 0.01 to about 10 µm, and preferably about 0.02 to about 5 µm. An anchor coat layer having the thickness within the above-mentioned range gives practically sufficient adhesive strength between the sealant layer and the film, and does not excessively raise the production cost.

Any material that is known for anchor coat layer formed on a polyamide film may be used as the material for the anchor coat layer. Such known material includes a reactive polyester resin, an oil-modified alkyd resin, a urethane modified alkyd resin, a melamine modified alkyd resin, an epoxy curing acrylic resin, epoxy-based resins (those containing, as a curing agent, amine, polyester which contains one or more carboxyl groups at terminal, phenol, isocyanate or the like), isocyanate-based resins (those containing, as a curing agent, amine, urea, carboxylic acid, or the like), a urethane-polyester resin, a polyurethane resin, a phenol resin, a polyester resin, a polyamide resin, a reactive acrylic resin, a vinyl acetate resin, a vinyl chloride resin and the like; and copolymers thereof. They may also be used as an aqueous resin prepared by dissolving or dispersing the resins in water. In addition, a silane coupling agent and other inorganic coating agents may be used as the anchor coat layer material. These materials may be used alone, or two or more of them may be used in combination.

An aqueous polyester resin is preferably used as the anchor coat layer material from the standpoint of improving the adhesive properties between the sealant layer and the biaxially oriented polyamide laminate film layer by the formation of the anchor coat layer, and for cost and hygienic considerations. The aqueous polyester resins may be formed by the polycondensation of glycols and, dicarboxylic acids or tricarboxylic acids. There are no particular restrictions on dicarboxylic acids or tricarboxylic acids, and examples of dicarboxylic acids or tricarboxylic acids include terephthalic acid, isophthalic acid, adipic acid, trimellitic acid and the like. There are no particular restrictions on glycols, and examples of glycols include ethylene glycol, neopenthyl glycol, butanediol, ethyleneglycol modified bisphenol A and the like. The aqueous polyester resins may be formed by graft copolymerization of acrylic monomer.

Sealant Layer

A sealant layer may be provided on at least one surface, particularly on the surface of layer A, to laminate two biaxially oriented polyamide laminate films of the present invention, or to laminate the film of the present invention and another film. The sealant layer is preferably provided on the surface of an anchor coat layer. There are no particular restrictions on the thickness of the sealant layer, but the thickness is generally about 20 to about 100 µm, and preferably about 30 to about 80 µm.

There are no particular restrictions on the material used for a sealant layer, and for example, polyolefin resins, such as low-density polyethylene, linear low-density polyethylene, high-density polyethylene, polypropylene and the like may be used. Particularly, low-density polyethylene and linear low-density polyethylene are preferably used, and linear low-density polyethylene is more preferably used.

The sealant layer may have a monolayer or multilayer structure. When the sealant layer is composed of a plurality of layers, each layer may consist of the same or a different kind of resin. Specifically, the sealant layer may be a laminate of different layers, each of them comprising copolymer, modified product of polymer, blend of polymers, or the like which is different from each other. For example, to improve the laminating or heat seal property, it is possible to laminate onto a layer used as the base layer, a layer comprising a resin with a lower Vicat softening point than that of the thermoplastic polyolefin resin contained in the base layer. Moreover, to provide heat resistance to the sealant layer, it is possible to laminate onto a base layer used as the base layer, a layer comprising a resin with a higher Vicat softening point than that of the thermoplastic polyolefin resin contained in a base layer used as the base layer.

The polyolefin resin of the sealant layer may contain various additives as required, and examples of the additives include plasticizers, heat stabilizers, ultraviolet absorbents, antioxidants, coloring agents, fillers, antistatic agents, antimicrobial agents, lubricants, anti-blocking agents, other resins and the like.

Adhesive Layer

When the biaxially oriented polyamide laminate film of the present invention has a sealant layer, the sealant layer may have an adhesive layer on its inner side. The adhesive layer has a thickness of generally about 0.5 to about 5 μm, and preferably about 1 to about 3 μm.

It is preferable that resins used as an adhesive agent have the glass transition temperature of preferably about −10 to about 40° C., and more preferably about −10 to about 20° C. Examples of such resins include polyurethane resin, polyester resin, epoxy resin, vinyl chloride resin, vinyl acetate resin, polyethylene resin, polypropylene resin, melamine resin, acrylic resin and the like. These resins may be used alone, or two or more of them may be used in combination or after melt-blending. As an adhesive agent, it is also effective to use an adhesive composition containing compounds having one or more functional groups, such as a carboxylic acid group, an acid anhydride, a (meth)acrylic acid skeleton, a (meth)acrylate ester skeleton and the like; epoxy compounds having one or more glycidyl groups, glycidyl ether groups or the like; or curing agents or curing accelerators having one or more reactive functional groups, such as an oxazoline group, an isocyanate group, an amino group, a hydroxyl group and the like.

A Process for Producing the Biaxially Oriented Polyamide Laminate Film of the Present Invention To produce the biaxially oriented polyamide laminate film of the present invention illustrated above, it is possible to use the successive biaxially stretching method and to raise the heat setting temperature after the transverse stretching. However, this method easily produces differences in physical properties in the width direction of the film. Specifically, the difference between the boiling water shrinkage proportions in oblique directions during immersion in often occurs in the width direction of the film. This causes a twisting phenomenon when a bag prepared in this manner is subjected to heating or a like treatment and tends to pose serious problems.

The process for producing the biaxially oriented polyamide laminate film of the present invention is suitable for avoiding the above problems. The process for producing the biaxially oriented polyamide laminate film of the present invention is carried out by a successive biaxially stretching method, the method comprising the steps of longitudinally stretching a substantially unoriented laminated polyamide film having a layered structure of A/B, A/B/A or A/B/C, and then transversely stretching the longitudinally stretched film at a ratio of about 3 times or more. The longitudinal stretching step is performed by carrying out a first stretching stage, at a temperature that is not less than the glass transition temperature (Tg) of the unoriented laminated polyamide film+10° C. and not more than the lower crystallization temperature (Tc) of the unoriented laminated polyamide film+20° C., at a stretching ratio of about 1.1 to about 3 times, and then, without cooling the stretched film to the glass transition temperature of the unoriented laminated polyamide film or lower, carrying out a second stage stretching at a temperature that is not less than the glass transition temperature of the unoriented laminated polyamide film+10° C. and not more than the crystallization temperature of the unoriented laminated polyamide film+20° C. in such a manner that the total longitudinal stretching ratio becomes about 3.1 to about 4 times. The process of the present invention will be illustrated in more detail as follows.

Preparation of Unoriented Film

In the process of the present invention, a substantially unoriented polyamide sheet having a layered structure of A/B, A/B/A or A/B/C is firstly prepared. Such an unoriented polyamide sheet is prepared by a method comprising the steps of melting the polymer for each layer of the A/B, A/B/A or A/B/C layered structure using different extruders, coextruding them, casting the extrudate onto a rotary drum from dies, and quenching for solidification, give a polyamide sheet; a method of laminating polymers constituting each layer; a method of using coextrusion in combination with the laminating methods and like methods. The polyamide sheet thus obtained is substantially unoriented.

Longitudinal Stretching

Next, the laminated film is stretched in the longitudinal direction (in the length direction). The longitudinal stretching may be carried out by heat roll stretching, infrared radiant stretching or other known longitudinal stretching methods.

The longitudinal stretching is carried out in two stages. First, the unoriented polyamide sheet is stretched at a temperature that is not less than the Tg of the unoriented polyamide film+10° C., and preferably not less than the Tg+20° C., and not more than the Tc of the unoriented polyamide film+20° C., and preferably not more than the Tc+10° C., at a stretching ratio of about 1.1 to about 3 times, and preferably about 1.5 to about 2.5 times. The temperature range in the first stage longitudinal stretching is more preferably from about (Tg+20) to about (Tc+10)° C. In the present specification, the temperature during the longitudinal stretching is the temperature of the film.

Stretching the unoriented film to the above-mentioned stretching ratio makes it possible to obtain sufficient stretching effects and to suppress the progress of crystallization of orientation, which causes films to break due to an increase in the stretching stress of the film during the second stage stretching, or to break during the transverse stretching. Moreover, stretching the unoriented film at this temperature suppresses necking and unevenness of thickness in films, as well as suppressing the progress of thermal crystallization, which causes films to break during the transverse stretching.

After the first stage stretching, the second stage stretching is carried out successively without cooling the stretched film to a temperature equal to or lower than the Tg of the unoriented polyamide film. The temperature of the film during the period between the first and second stages is one of the characteristics of the present invention. Namely, the film is not forcibly cooled, but heated to maintain the temperature of the film. This temperature maintenance is also utilized to pre-heat or heat the film for the second stage stretching. By maintaining the temperature of the film at a temperature that is higher than the Tg of the unoriented polyamide film without forcible cooling of the film between the first and the second stage, it is possible to suppress thermal crystallization, which is caused by forcibly cooling and reheating the film and which frequently causes films to break due to an increase in the transverse stretching stress. Although thermal crystallization also proceeds even during the temperature maintenance without cooling the film to the Tg of the unoriented polyamide film or lower, the progress is so slow, as compared to the case in which the above-mentioned forcible cooling and reheating are carried out, that no practical problem occurs.

Next, the second stage stretching of the film is carried out at a temperature that is not less than the Tg of the unoriented polyamide film+10° C., preferably not less than the Tg+20° C., and not more than the Tc of the unoriented polyamide film+20° C., and preferably not more than the Tc+10° C. in such a manner that the total longitudinal stretching ratio becomes about 3.1 to about 4 times, and preferably about 3.3 to about 3.7 times. It is particularly preferable that the temperature range in the second stage longitudinal stretching is from about (Tg+20) to about (Tc+10)° C. Stretching the film to such a stretching ratio makes it possible to obtain sufficient strength in the longitudinal direction and to suppress the frequent occurrence of film break caused by an increase in the transverse stretching stress. When the second stage longitudinal stretching is carried out within this temperature range, it is possible to suppress the increase in unevenness of thickness, the progress of thermal crystallization, the increase in transverse stretching stress and the frequent occurrence of film break.

Transverse Stretching

The laminated monoaxially oriented polyamide film thus obtained is stretched in the transverse direction at a temperature that is not lower than 100° C. but lower than the melting point of the unoriented polyamide film, and preferably within a temperature range from about 100 to about 180° C. (although the temperature range varies depending on the film material), at a stretching ratio of about 3 to about 5 times, and preferably about 3.5 to about 4.2 times. When the transverse stretching step is carried out within this temperature range, it is possible to obtain sufficient strength in the transverse direction and to suppress the deterioration of the stretching property in the transverse direction that results in film break and unevenness of thickness.

In the present specification, the temperature during the transverse stretching step also means the temperature of the film. The transverse stretching may be carried out using any known transverse stretching machine, such as a tenter.

Heat setting

After the transverse stretching step, the obtained film may be thermally set at a temperature of about 200 to about 230° C., and preferably about 210 to about 220° C., for about 1 to about 10 seconds, and preferably about 1 to about 5 seconds.

As mentioned above, a substantially unoriented polyamide sheet having a layered structure of A/B, A/B/A or A/B/C is longitudinally stretched in two steps. After the first stage stretching, the second stage stretching is carried out successively without cooling the stretched film to Tg or lower, followed by transverse stretching and heat setting. Thereby a biaxially oriented polyamide laminate film having a maximum dimensional change of 4% or less during immersion in 95° C. hot water, a maximum dimensional change of 6% or less after withdrawal from said hot water, and a maximum dimensional change of 4% or less after heat treatment in dry hot air at 160° C. could be obtained.

This may be due to the following phenomenon. By carrying longitudinal stretching in two stages, the surface of the sheet was subjected to heathistory, thermal crystallization was adequately promoted, crystallization of the surface of the obtained biaxially oriented polyamide film was promoted, and the moisture absorption property of the biaxially oriented polyamide film decreased, thereby dimensional change during immersion in hot water and after withdrawal from the hot water decreases. Moreover, the division of the longitudinal stretching into two stages leads to a reduction in stretching stress, and the temperature maintenance of the film during the period between the first and second stretching stages prevents the promotion of crystallization due to hydrogen bonds that is peculiar to polyamide and that are produced by forcible cooling and re-heating, and also have the effects of alleviating orientation of the sheet after the first stretching, and relaxing the structure of the monoaxially oriented film before transverse stretching. As a result, the orientation in the transverse direction resulting from the transverse stretching becomes easy, and differences in physical properties in the width direction of the film which occur in a tenter are reduced by the reduction in transverse stretching stress. Taken together, a biaxially oriented polyamide film with less operational trouble can be economically provided.

Formation of Anchor Coat Layer

In the process of the present invention, it is possible to form an anchor coat layer on the surface of layer A. The anchor coat layer may be formed by an in-line method comprising applying an anchor-coating agent on the surface of layer A during the production of a polyamide resin film, or an off-line method comprising applying an anchor-coating agent on the surface of layer A in an other step than the production of a polyamide resin film. Any known coating methods may be employed to apply the coating agent to the surface of layer A. Examples of known methods include roll coating method, reverse coating method, roll brush method, spray coating method, air knife coating method, gravure coating method, impregnation method, curtain flow coating method, and the like.

In the present invention, corona treatment, flame treatment, low-temperature plasma treatment, glow discharge plasma treatment, reverse sputtering treatment, surface roughening treatment, or the like may be applied to the surface of a biaxially oriented polyamide laminate film prior to formation of the sealant layer, thereby improving adhesive strength between the sealant layer and the biaxially oriented polyamide laminate film layer.

Formation of Sealant Layer

On the biaxially oriented polyamide laminate film of the present invention, specifically on layer A, a sealant layer may be formed as a heat seal layer. The material and thickness of the sealant layer are as mentioned above. The sealant layer may be formed by any known methods used for forming a sealant layer. Examples of such known methods include a dry laminating method using an adhesive agent, wet laminating method, extrusion laminating method, coextrusion laminating method and the like.

The obtained biaxially oriented polyamide laminate film or sheet of the present invention exhibits excellent adhesive properties between the sealant layer and the biaxially oriented polyamide laminate film layer, persistent adhesive properties during boiling or retort treatment, and secondary processing properties. The biaxially oriented polyamide laminate film or sheet of the present invention can be used effectively as a wrapping material for fermented soybean pastes (miso), pickles, side dishes, baby food, food boiled down in soy sauce (tsukudani), pastes made from konjak flour (konjak), tube-shaped fish paste cakes (chikuwa), boiled fish pastes (kamaboko), processed marine products, meatballs, hamburger steaks, Mongolian mutton barbecue, ham, sausage, other animal processed products, green tea, coffee, black tea, dried bonito, sea tangle(kombu), oily confectioneries such as potato chips, butter peanuts and the like, rice sweets, biscuits, cookies, cakes, steamed buns with a bean-jam filling, sponge cakes, cheeses, butter, cut rice cakes, soups, sauces, noodles, or Japanese horseradish bean pastes. Moreover, the biaxially oriented polyamide laminate film or sheet of the present invention can be effectively used as a wrapping material for industrial materials in medical, electronic, chemical, mechanical or like fields, for example, for toothpastes, pet food, agricultural chemicals, fertilizers, transfusions, semiconductors, precision materials. Furthermore, there are no particular restrictions on the form of the wrapping material, and the biaxially oriented polyamide laminate film or sheet of the present invention can be widely used in the form of a bag, lid, cup, tube, standing pack or the like.

EXAMPLES

The present invention will be illustrated in more detail by the following examples, but the scope of the present invention is not restricted thereto.

Various performance tests were conducted on the examples given below by the following methods.

Density of Projections on the Surface of the Film

The obtained film was subjected to aluminum vapor deposition in a vacuum. The aluminum vapor deposition was carried out for 25 seconds under a vacuum of $5 \times 10^{-5}$ Torr. This film was observed using a two beam interference microscope equipped with a 0.54 μm wavelength filter, and the number of rings (projection height: equivalent to 0.27 μm), which overlapped one or more rings, was counted per 1.3 projections/mm² of film. The maximum value among the number of rings counted was designated as the number per unit area (projection density) over the entire width of the film.

Adhesive Strength

The adhesive strength of a laminated film was measured using a Tensilon UTM2 (manufactured by Toyo Boldwin Co., Ltd.) by separating the laminate layer and the film substrate at an angle of 180°, while applying water on the interface in which peeling takes place, and by measuring the S-S curve between the sealant layer and the film substrate.

Glass Transition Temperature (Tg) and Lower Crystallization Temperature (Tc)

A few mg of an unoriented polyamide sheet was cut off perpendicular to the thickness direction and frozen in liquid nitrogen. After defrosting the sample under reduced pressure, the endothermic peak was measured using a differential scanning calorimeter (DSC, manufactured by Seiko Instruments Inc. while elevating the temperature at a rate of 10° C./min. When two or more endothermic peaks were detected, the Tg and Tc of the unoriented polyamide sheet were determined by finding the arithmetic mean according to the area ratios of the peaks.

Film Temperature

The film temperature during longitudinal stretching, temperature maintenance and transverse stretching was measured using a radiation thermometer (IR-004, manufactured by MINOLTA Co., Ltd.).

Film Forming State

The number of film ruptures(breaks) was counted after the film was successively biaxially stretched for 2 hours under the fixed conditions.

Dimensional Change

Strips (length of 100 mm×a width of 10 mm) prepared by cutting out in all directions from the film at 10° pitch were left standing for 2 hours at 23° C. and 65% RH. Then, base lines were drawn at 25 mm from both ends in the longitudinal direction (the portion to be fixed with a chuck), and the distance between the base lines was designated as the length before treatment (A: mm). Next, the strips were fixed with chucks, applied with an initial load of 10 g, while immersed in 95° C. hot water for 30 minutes. The distance between the base lines was then measured using a heat shrinkage stress tester equipped with a differential conversion displacement meter (manufactured by A & D). The distance was designated as the length after hot water immersion (B: mm). The strips were withdrawn from the hot water, dried and left standing at 23° C. and 65% RH for 2 hours. The distance between the base lines was measured and the distance was designated as the length after withdrawal from the hot water (C: mm). Moreover, the strips were left standing at 23° C. and 65% RH for 2 hours, placed in an oven at 160° C. for 30 minutes, then again left standing at 23° C. and 65% RH for 2 hours after withdrawal from the oven. The distance between the base lines was then measured and the distance was designated as the length after treatment (D: mm). The dimensional change can be calculated by the following formulas (1), (2) and (3). The maximum dimensional change means the maximum value among all of the dimensional change measured using the strips cut out from the film in all directions at 10° pitch.

$$\text{Dimensional change (\%) during immersion in hot water} = |A-B|/A \times 100 \quad (1)$$

$$\text{Dimensional change (\%) after withdrawal from hot water} = |A-C|/A \times 100 \quad (2)$$

$$\text{Maximum dimensional change (\%) after heat treatment in dry hot air at } 160° C. = |A-D|/A \times 100 \quad (3)$$

Difference Between the Boiling Water Shrinkage Proportions of Directions Which are Oblique Each Other Two film samples were cut out from a film with a entire width of 4 m prepared using a film maker, each sample having an area in which a circle with a diameter of 200 mm can be drawn, the center of the circle being located in a distance of 40% of a film width (1.6 m) from the center of the film. Then, a circle with a diameter of 200 mm was drawn on each film sample around the aforementioned center, and the sample was left standing at 23° C. and 65% RH for 2 hours. Next, straight lines were drawn to pass through the center of the circle at angles of 45° and 135° under the condition the longitudinal direction of the film is designated as 0°. The diameter of the circle in each direction was measured, and these were designated as the lengths before treatment. The sample was heat treated in boiling water for 30 minutes, withdrawn from the hot water, dried, and left standing at 23° C. and 65% RH for 2 hours. Thereafter, the diameters were measured at angles of 45° and 135°, respectively, and these were designated as the lengths after treatment. The boiling water shrinkage proportion is calculated by the following formula.

Boiling water shrinkage proportion=[(length before treatment−length after treatment)/length before treatment]×100(%)

The absolute value of the difference between the boiling water shrinkage proportion at angle of 45° and the boiling water shrinkage proportion at angle of 135° was calculated, and the absolute values of the difference between the boiling water shrinkage proportions of the two film samples were averaged. The result was designated as the difference between the boiling water shrinkage proportions in oblique directions.

Example 1

The materials described below for layers A, B and C were extruded from a T-die to have a thickness proportion(%) of 15/70/15 for A/B/C. The layers were adhered to a rotary drum, of which temperature was 20° C., with static electricity by applying DC high voltage and cooled to solidify, thereby producing an unoriented polyamide sheet with a thickness of 190 μm. The Tg and Tc of the sheet were 53° C. and 79° C., respectively.

Layer A: layer A comprised a mixture of a nylon 6 master batch and nylon 6 (25 parts by weight), a nylon 6T/nylon 6 copolymer (75 parts by weight, copolymerization ratio: 55/45 mol % (73:27 wt. %) and fine particles for forming surface projections (0.20 wt. % with respect to the total of nylon 6 master batch, nylon 6 and nylon 6T/nylon 6 copolymer, silica fine particles, average particle diameter: 2.5 μm and pore volume: 1.8 ml/g).

Layer B: layer B comprised nylon 6 (95 parts by weight), meta-xylene adipamide (5 parts by weight)(T-600, manufactured by TOYOBO CO., LTD.) and the above-mentioned fine particles for forming surface projections (0.50 wt. % with respect to the total of nylon 6 and meta-xylene adipamide).

Layer C: layer C comprised nylon 6 (95 parts by weight), T-600 (5 parts by weight) and the above-mentioned fine particles for forming surface projections (0.60 wt. % with respect to the total of nylon 6 and T-600).

This sheet was firstly stretched longitudinally at 75° C. and at a stretching ratio of 1.8 times. The sheet was secondly stretched longitudinally at 77° C. in a manner that the overall stretching ratio became 3.3 times, temperature of the sheet being maintained at 70° C. The sheet was successively placed in a tenter, and transversely stretched at 145° C. at a stretching ratio of 4 times. The sheet was thermally set at 212° C., relaxed by 2% in the transverse direction and cooled. Then, both edges were cut off to produce a biaxially oriented polyamide film having a thickness of 15 μm. In this case, continuous film forming under the fixed conditions for 2 hours did not cause the film to break. After the longitudinal stretching, the film was coated with aqueous dispersion of acrylic graft polyester resin with a solid thickness of about 0.1 μm.

Unoriented polyethylene (thickness: 50 μm) as a sealant layer was dry laminated on this film using an adhesive agent (A310/A10, manufactured by TAKEDA CHEMICAL INDUSTRIES, LTD., application amount: 2 g/m²), and left standing at 45° C. for 4 days, thereby producing a laminated film.

With regard to the laminated film having the sealant layer, the following item (1) was evaluated. With regard to the biaxially oriented polyamide film having no sealant layer, forming states (the number of breaks when the film was successively biaxially stretched for 2 hours under the fixed conditions) and the following items (2) to (6) were evaluated.

(1) Adhesive strength between the sealant layer and the film when water was applied on the separation interface of the films after immersion in 95° C. hot water for 30 minutes and left standing for 1 hour (mN/15 mm),
(2) Projection density on the surface of the film (projections/projections/mm2)
(3) Maximum dimensional change during immersion in hot water (%)
(4) Maximum dimensional change after withdrawal from hot water (%)
(5) Maximum dimensional change after dry treatment at 160° C.
(6) Difference between the boiling water shrinkage proportions in oblique directions (%)

Example 2

A biaxially oriented polyamide laminate film was prepared in a similar manner as in Example 1 except that the content of fine particles for forming surface projections in layer A is 0.05 wt. %. In the production of the biaxially oriented polyamide film, continuous film forming under the fixed conditions for 2 hours did not cause breakage.

Example 3

A biaxially oriented polyamide laminate film was prepared in a similar manner as in Example 1 except that a mixture of nylon 6 (5 parts by weight), a nylon 6T/nylon 6 copolymer (95 parts by weight, copolymerization ratio: 55/45) and the same fine particles for forming surface projections as that used in Example 1 (0.20 wt. % with respect to the total of nylon 6 and nylon6T/nylon6 copolymer), were used as materials for layer A. In the production of the biaxially oriented polyamide film, continuous film forming under the fixed conditions for 2 hours did not cause breakage.

Example 4

A biaxially oriented polyamide laminate film was prepared in a similar manner as in Example 1 except that a mixture of nylon 6 (96.5 parts by weight), a polyamide elastomer (3.5 parts by weight) and the above-mentioned fine particles for forming surface projections (0.50 wt. % with respect to the total of nylon 6 and polyamide elastomer) were used as materials for layer B; a mixture of nylon 6 and a nylon 6 master batch (25 parts by weight), a nylon 6T/nylon copolymer (75 parts by weight, copolymerization ratio: 55/45) and the same fine particles for forming surface projections as that used in Example 1 (0.45 wt. % with respect to the total of nylon 6, nylon 6 master batch and nylon 6T/nylon copolymer) were used as materials for layer C.

Example 5

A biaxially oriented polyamide laminate film was prepared in a similar manner as in Example 4 except that a mixture of nylon 6 and a nylon 6 master batch (40 parts by weight), T-600 (60 parts by weight) and the same fine particles for forming surface projections as that used in Example 1 (0.45 wt. % with respect to the total of nylon 6, nylon 6 master batch and T-600), were used as materials for layer C.

Comparative Example 1

A biaxially oriented polyamide laminate film was prepared in a similar manner as in Example 1 except that the amount of fine particles for forming surface projections on layer A is changed from 0.20 wt. % to 0.70 wt. %. In the production of the biaxially oriented polyamide film, continuous film forming under the fixed conditions for 2 hours did not cause breakage.

Comparative Example 2

A biaxially oriented polyamide laminate film was prepared in a similar manner as in Example 1 except that a mixture of nylon 6 (90 parts by weight) and a nylon 6T/nylon 6 copolymer (10 parts by weight, copolymerization rate: 55/45), and the above-mentioned fine particles for forming surface projections (0.20 wt. % with respect to the total of nylon 6 and nylon 6T/nylon 6 copolymer) were used as materials for layer A. In the production of the biaxially oriented polyamide film, continuous film forming under the fixed conditions for 2 hours did not cause breakage.

Comparative Example 3

A biaxially oriented polyamide film was prepared in a similar manner as in Example 1 except that the stretching of an unoriented film was performed by the procedure described below. Specifically, the sheet was longitudinally stretched at 65° C. in a manner that the stretching ratio became 3.3 times, successively fed into a stenter, and transversely stretched at 145° C. in a manner that the stretching ratio became 4 times. Thereafter the sheet was thermally set at 215° C. and relaxed by 2% in the transverse direction. Continuous film forming under the fixed conditions for 2 hours caused one breakage.

The results of each example are shown in Table 1.

TABLE 1

| | Production Conditions | | | | Film Characteristics | | | | | |
|---|---|---|---|---|---|---|---|---|---|---|
| | (A) | (B) | (C) | (D) | (1) | (2) | (3) | (4) | (5) | (6) |
| Example 1 | 0.20 | 75 | 2 | 212 | 2700 | 180 | 3.4 | 4.1 | 3.6 | 1.7 |
| Example 2 | 0.05 | 75 | 2 | 212 | 2950 | 110 | 3.4 | 4.0 | 3.5 | 1.8 |
| Example 3 | 0.20 | 95 | 2 | 212 | 2800 | 170 | 2.7 | 3.4 | 2.6 | 1.4 |
| Example 4 | 0.20 | 75 | 2 | 212 | 2500 | 190 | 3.3 | 3.9 | 3.0 | 1.9 |
| Example 5 | 0.20 | 75 | 2 | 212 | 2600 | 180 | 3.3 | 3.5 | 2.9 | 2.0 |
| Comparative example 1 | 0.70 | 75 | 2 | 212 | 1200 | 290 | 3.4 | 4.1 | 3.5 | 1.8 |
| Comparative example 2 | 0.20 | 10 | 2 | 212 | 1400 | 180 | 4.4 | 5.2 | 4.2 | 2.4 |
| Comparative example 3 | 0.20 | 75 | 1 | 215 | 2500 | 230 | 4.2 | 4.0 | 4.1 | 2.8 |

(A) Addition amount of fine particles for forming surface projections in layer A (wt. %)
(B) Content ratio of a nylon 6T/nylon 6 copolymer in layer A (wt. % with respect to the total polyamide resin)
(C) Number of stages of longitudinal stretching (stages)
(D) Heat setting temperature (° C.)
(1) Adhesive strength between the sealant layer and the film when water is applied on the separation interface of the films after immersion in 95° C. hot water for 30 minutes and left standing for 1 hour (mN/15 mm)
(2) Projection density on the surface of the film (projections/projections/mm2)
(3) Maximum dimensional change during immersion in hot water (%)
(4) Maximum dimensional change after withdrawal from hot water (%)
(5) Maximum dimensional change after heat treatment in dry hot air at 160° C.
(6) Difference between the boiling water shrinkage proportions in oblique directions (%)

INDUSTRIAL APPLICABILITY

The biaxially oriented polyamide laminate film of the present invention is free from breakage, reduces the differences in physical properties in the width direction that occurs in a tenter, exhibits excellent adhesive properties between a sealant layer and the film, and excellent resistance to fatigue from flexing and operability, and can be produced economically. Moreover, the process of the present invention can economically produce such a biaxially oriented polyamide laminate film.

The biaxially oriented polyamide laminate film of the present invention is preferably used as a wrapping material for various foods, toothpastes, pet food, agricultural chemicals, fertilizers, transfusions, semiconductors, precision products, and the like.

The invention claimed is:
1. A film consisting essentially of
   (a) a biaxially oriented polyamide laminate film having a layered structure of A/B, A/B/A, or A/B/C,
   (b) an anchor coat layer consisting essentially of an aqueous polyester resin that is formed on at least one surface of the laminate film, and
   (c) a sealant layer consisting essentially of polyolefin resin that is formed on the anchor coat layer,
   layer A having no projections with a height of 0.27 μm or higher on the surface, or having a density of projections with a height of 0.27 μm or higher present on the surface of less than 200 projections/mm², and
   the laminate film exhibiting a maximum dimensional change of 4% or less during immersion in 95° C. hot water, a maximum dimensional change of 6% or less after withdrawal from said hot water, and a maximum dimensional change of 4% or less after heat treatment in dry hot air at 160° C., wherein
   layer A comprises i) a composition containing X, or ii) a composition containing X and Y;
   layer B comprises iii) a composition containing Y, iv) a composition containing Y and X, v) a composition containing Y and Z, or vi) a composition containing X, Y and Z;

layer C comprises vii) a composition containing X, viii) a composition containing Y, or ix) a composition containing X and Y, wherein X is 1) a resin composition which is a mixture of (a) an aromatic polyamide resin obtained by reacting a terephthalic acid with an aliphatic diamine, and/or an aromatic polyamide resin obtained by reacting an adipic acid and meta-xylylenediamine, and (b) an aliphatic polyamide resin, wherein the aromatic polyamide resin (a) is contained in an amount of 10 mol % or more; or 2) a resin composition which is a copolymer of the monomers of (a) and the monomers of (b), wherein the monomers of (a) are contained in an amount of 10 mol % or more;

wherein Y is an aliphatic polyamide resin;

wherein Z is an improver of resistance to fatigue from flexing.

2. The film according to claim 1, wherein the compositions used for layers A and C each comprises 50 to 100 wt. % of X and 0 to 50 wt. % of Y, and the composition used for layer B comprises 0 to 10 wt. % of X, 80 to 100 wt. % of Y and 0 to 10 wt. % of Z.

3. A wrapping container formed using the film according to claim 1.

4. A method of wrapping a substance wherein the method comprises wrapping a substance with the film according to claim 1.

5. A process for producing the biaxially oriented polyamide laminate film of claim 1 using a successive biaxial stretching method which comprises longitudinally stretching a substantially unoriented laminated polyamide film having a layered structure of A/B, A/B/A or A/B/C, followed by transverse stretching at a ratio of 3 times or more, the longitudinal stretching being performed by carrying out a first stage stretching the unoriented film at a temperature that is not less than the glass transition temperature of the unoriented laminated polyamide film+10° C. and not more than the lower crystallization temperature of the unoriented laminated polyamide film+20° C., at a stretching ratio of 1.1 to 3 times, and then, without cooling the stretched film to the glass transition temperature of the unoriented laminated polyamide film or lower, carrying out a second stretching stage of stretching the resulting film at a temperature that is not less than the glass transition temperature of the unoriented laminated polyamide film+10° C. and not more than the low-temperature crystallization temperature of the unoriented polyamide film+20° C. in such a manner that the overall longitudinal stretching ratio becomes 3.1 to 4 times.

6. The film according to claim 1, wherein layer A comprises a surface with projections with a height of 0.27 μm or higher, wherein the density of the projections is less than 200 projections/mm$^2$.

7. A film consisting essentially of
(a) a biaxially oriented polyamide laminate film having a layered structure of A/B,
(b) an anchor coat layer consisting essentially of an aqueous polyester resin that is formed on at least one surface of the laminate film, and
(c) a sealant layer consisting essentially of polyolefin resin that is formed on the anchor coat layer,
layer A having no projections with a height of 0.27 μm or higher on the surface, or having a density of projections with a height of 0.27 μm or higher on the surface of less than 200 projections/mm$^2$, and
the laminate film exhibiting a maximum dimensional change of 4% or less during immersion in 95° C. hot water, a maximum dimensional change of 6% or less after withdrawal from said hot water, and a maximum dimensional change of 4% or less after heat treatment in dry hot air at 160° C., wherein layer A comprises a composition containing X and layer B comprises a composition containing Y and Z, wherein X is 1) a resin composition which is a mixture of (a) an aromatic polyamide resin obtained by reacting a terephthalic acid with an aliphatic diamine, and/or an aromatic polyamide resin obtained by reacting an adipic acid and meta-xylylenediamine, and (b) an aliphatic polyamide resin, wherein the aromatic polyamide resin (a) is contained in an amount of 10 mol % or more; or 2) a resin composition which is a copolymer of the monomers of (a) and the monomers of (b), wherein the monomers of (a) are contained in an amount of 10 mol % or more;

wherein Y is an aliphatic polyamide resin;

wherein Z is an improver of resistance to fatigue from flexing.

8. A film consisting essentially of
(a) a biaxially oriented polyamide laminate film having a layered structure of A/B/A,
(b) an anchor coat layer consisting essentially of an aqueous polyester resin that is formed on at least one surface of the laminate film, and
(c) a sealant layer consisting essentially of polyolefin resin that is formed on the anchor coat layer,
layer A having no projections with a height of 0.27 μm or higher on the surface, or having a density of projections with a height of 0.27 μm or higher on the surface of less than 200 projections/mm$^2$, and
the laminate film exhibiting a maximum dimensional change of 4% or less during immersion in 95° C. hot water, a maximum dimensional change of 6% or less after withdrawal from said hot water, and a maximum dimensional change of 4% or less after heat treatment in dry hot air at 160° C., wherein layer A comprises a composition containing X, layer B comprises a composition containing Y and Z, and layer A comprises a composition containing X, wherein X is 1) a resin composition which is a mixture of (a) an aromatic polyamide resin obtained by reacting a terephthalic acid with an aliphatic diamine, and/or an aromatic polyamide resin obtained by reacting an adipic acid and meta-xylylenediamine, and (b) an aliphatic polyamide resin, wherein the aromatic polyamide resin (a) is contained in an amount of 10 mol % or more; or 2) a resin composition which is a copolymer of the monomers of (a) and the monomers of (b), wherein the monomers of (a) are contained in an amount of 10 mol % or more;

wherein Y is an aliphatic polyamide resin;

wherein Z is an improver of resistance to fatigue from flexing.

9. A film consisting essentially of
(a) a biaxially oriented polyamide laminate film having a layered structure of A/B/C,
(b) an anchor coat layer consisting essentially of an aqueous polyester resin that is formed on at least one surface of the laminate film, and
(c) a sealant layer consisting essentially of polyolefin resin that is formed on the anchor coat layer,
layer A having no projections with a height of 0.27 μm or higher on the surface, or having a density of projections with a height of 0.27 μm or higher on the surface of less than 200 projections/mm$^2$, and the laminate film exhibiting a maximum dimensional change of 4% or less during immersion in 95° C. hot water, a maximum dimensional change of 6% or less after withdrawal from said hot water, and a maximum dimensional change of 4% or less after heat treatment in dry hot air at 160° C., wherein layer A comprises a composition containing X, layer B comprises a composition containing Y, Z and X, and layer C comprises a composition containing X, wherein X is 1) a resin composition which is a mixture of (a) an aromatic polyamide resin obtained by reacting a terephthalic acid with an aliphatic diamine, and/or an aromatic polyamide resin obtained by reacting an adipic acid and meta-xylylenediamine, and (b) an aliphatic polyamide resin, wherein the aromatic polyamide resin (a) is contained in an amount of 10 mol % or more; or 2) a resin composition which is a copolymer of the monomers of (a) and the monomers of (b), wherein the monomers of (a) are contained in an amount of 10 mol % or more;

wherein Y is an aliphatic polyamide resin;

wherein Z is an improver of resistance to fatigue from flexing.

* * * * *